United States Patent [19]

Sasaki et al.

[11] Patent Number: 4,473,523
[45] Date of Patent: Sep. 25, 1984

[54] PROCESS FOR CONTINUOUSLY PRODUCING AN AROMATIC POLYIMIDE FILM

[75] Inventors: Yoshikazu Sasaki; Hiroshi Inoue, both of Hirakata; Youji Negi, Ogaki; Kazuhiko Sakai, Kagamihara, all of Japan

[73] Assignee: UBE Industries, Ltd., Ube, Japan

[21] Appl. No.: 457,441

[22] Filed: Jan. 12, 1983

Related U.S. Application Data

[63] Continuation-in-part of Ser. No. 245,182, Mar. 18, 1981, abandoned.

[30] Foreign Application Priority Data

Mar. 19, 1980 [JP] Japan .................................. 55-34046

[51] Int. Cl.³ ................................................ B29D 7/24
[52] U.S. Cl. ................................ 264/176 R; 264/204; 264/216; 524/323; 524/341; 528/183; 528/188; 528/353
[58] Field of Search .................. 264/176 R, 204, 216; 528/183, 353, 188; 524/323, 341

[56] References Cited

U.S. PATENT DOCUMENTS

| | | | |
|---|---|---|---|
| 3,345,342 | 10/1967 | Angelo | 528/183 |
| 3,502,762 | 3/1970 | Haller | 264/204 |
| 3,619,461 | 11/1971 | Gay | 264/288.4 |
| 3,666,709 | 5/1972 | Susuki et al. | |
| 3,862,897 | 1/1975 | Gattus et al. | 264/216 |
| 3,870,674 | 3/1975 | Farrissey, Jr. et al. | |
| 4,247,443 | 1/1981 | Sasaki et al. | 524/34.1 |
| 4,290,936 | 9/1981 | Sasaki et al. | 528/183 |
| 4,378,324 | 3/1983 | Makino et al. | 264/41 |

FOREIGN PATENT DOCUMENTS

2037305A 7/1980 United Kingdom ................ 528/183

Primary Examiner—Jeffery R. Thurlow
Attorney, Agent, or Firm—Finnegan, Henderson, Farabow, Garrett & Dunner

[57] ABSTRACT

An aromatic polyimide film having excellent mechanical, thermal and electrical properties, is continuously produced by the steps of:

preparing a dope solution having a rotation viscosity of $500-10^5$ poises at 100° C. by uniformly dissolving aromatic polyimide in a solvent consisting of at least one phenol compound; extruding the dope solution through a T-die at 50° C. or more, but at least 30° C. below the boiling point of the solvent, under conditions which cause the apparent viscosity and shear stress of the dope solution to be $500-5 \times 10^4$ poises and $10^4-10^6$ dyne·cm$^{-2}$, respectively, to form a filmy stream of the dope solution; placing the filmy stream of the dope solution on a surface of a supporting means while heating the surface at a temperature of 50° C. or more and continuously moving it along its endless path, maintaining the placed filmy stream of the dope solution on the moving, heating surface of the supporting means until the filmy stream forms a film having a uniform thickness and then the film is solidifed by evaporating the solvent therefrom to an extent that the concentration of the solvent is 50% by weight or less; continuously peeling off the solidified film from the moving heating surface of the supporting means; and drying the peeled film at a temperature of 200° C. to 600° C. to provide an aromatic polyimide film free from the solvent.

9 Claims, 1 Drawing Figure

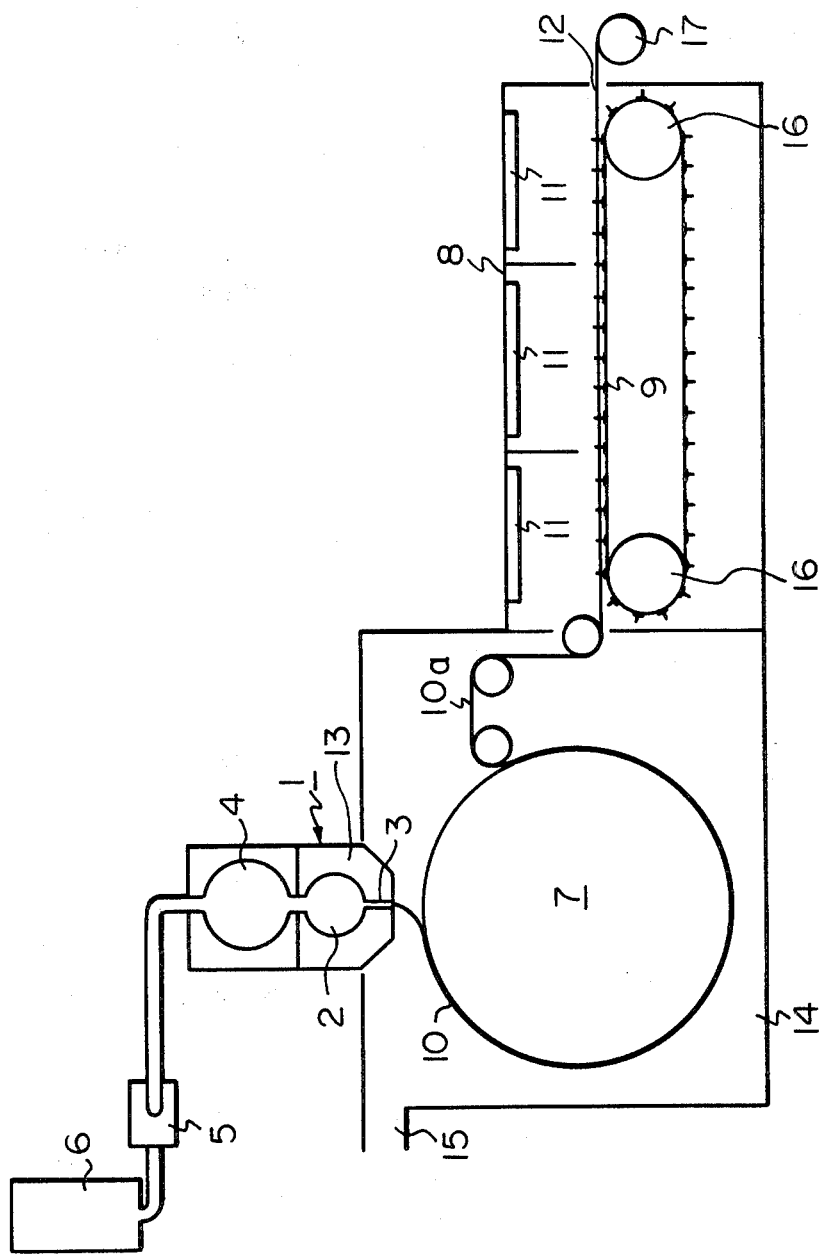

PROCESS FOR CONTINUOUSLY PRODUCING AN AROMATIC POLYIMIDE FILM

CROSS-REFERENCE TO RELATED APPLICATION

This is a continuation-in-part application from the U.S. application Ser. No. 06/245/82 filed on Mar. 18, 1981 and now abandoned.

BACKGROUND OF THE INVENTION

1. Field of the Invention

The present invention relates to a process for continuously producing an aromatic polyimide film. More particularly, the present invention relates to a process for continuously producing an aromatic polyimide film with an excellent quality and productivity by means of of extrusion casting of a dope solution of the aromatic polyimide having a relatively high viscosity through an extruder provided with a T-die.

2. Description of the Prior Art

It is known that an aromatic polyimide having a high molecular weight and a high content of imide structure can be produced by carrying out successively an operation for polymerizing an aromatic tetracarboxylic acid or its functional derivative, for example, pyromellitic dianhydride with an aromatic diamine and another operation for converting the resulting polymerization product, that is, a polyamic acid, into the corresponding polyimide resin. It is also known that this type of aromatic polyimide resin is suitable for producing various shaped articles, for example, film and sheet, and the resultant shaped aromatic polyimide resin articles exhibit an excellent heat-resisting property and superior mechanical strength.

However, it is known that the pyromellitic acid type aromatic polyimide resin having a high molecular weight and a high content of the imide structure neither melt even at a high temperature of 300° C. or more, nor one dissolved in any organic solvent. Accordingly, in order to produce a film from the pyromellitic acid type aromatic polyimide resin, a polyamic acid is prepared from pyromellitic dianhydride and an aromatic diamine in an organic polar solvent, the resultant solution of the polyamic acid in an organic polar solvent is spread on a peripheral surface of a metal drum or an upper surface of a metal plate to form a thin film of the solution having a uniform thickness, the film of the solution is subjected to an evaporation procedure of the solvent at an elevated temperature to eliminate the solvent from the film, the evaporation undesirably causing the polyamic acid to be partially imidized, and, finally, the film of the partially imidized polyamic acid is heated at an elevated temperature so as to produce a completely imidized (and dehydrated) aromatic polyimide film.

The above-mentioned known method for producing the aromatic polyimide film is disadvantageous in that in the elimination of the solvent from the film of the polyamic acid solution, the polyamic acid is undesirably partially imidized; it is necessary to convert the polyamic acid film to a polyimide film by completely imidizing (dehydrating) the polyamic acid; the polyamic acid solution is unstable in storage. Therefore, it is very difficult to produce a high performance aromatic polyimide film with a satisfactory reproducibility by the above-mentioned conventional method.

In recent years, in the preparation of aromatic polyimide films it has been proposed to use a solution of aromatic polyimide uniformly dissolved in an organic polar solvent in a high concentration thereof.

For example, Japanese Unexamined Patent Publication No. 50-113597 (1975) discloses a solution of an aromatic polyimide resin in an organic polar solvent. The solution is prepared in such a manner that a mixture of a biphenyl tetracarboxylic dianhydride with an aromatic diamine is heated in an organic polar solvent consisting of cresol, a mixture of xylene and cresol or a mixture of N-methylpyrrolidone and xylene, at an elevated temperature, thereby to give a viscous solution. This patent publication also discloses an aromatic polyimide film prepared in such a manner that the polyimide solution is spread on a surface of a copper plate; the thus spread solution on the copper plate is dried at a temperature of about 100° C.; the dried film is baked at a temperature of 200° C., and; the copper plate is then etched out to obtain an aromatic polyimide film.

However, the above-mentioned process contains an impractical procedure of etching out the copper plate. Therefore, this process is inferior in productivity and useless for industry.

Furthermore, it is well known that generally, a polymer film can be produced by naturally spreading a low viscosity solution of the polymer is a solvent on a peripheral surface of a drum or an upper surface of a flat plate, to provide a film of the polymer solution and by gradually evaporating away the solvent from the polymer solution film. Therefore, from the above-mentioned prior arts, it is expected that the above-mentioned aromatic polyimide solution having a high viscosity can be converted into a solid film by the solution-spreading method.

However, an aromatic polyimide having a high molecular weight and a high melting point can be dissolved in high concentration only in certain types of phenol compounds, and the resultant solution exhibits a high viscosity. Therefore, it is impossible to spread the highly viscous solution of the aromatic polyimide on the peripheral surface of the drum or the upper surface of a flat surface at an ambient temperature and to produce a thin film of the solution at the ambient temperature. In order to produce the film from the coventional aromatic polyimide solution by using the solution-spreading method, it is necessary to decrease the viscosity of the aromatic polyimide solution to an extent that the solution can be naturally spread, by elevating the temperature of the solution to a level close to the boiling point of the solvent in the solution. This elevated temperature of the solution causes the solvent in the spread solution film to by vigorously evaporated and, sometimes, results in the formation of bubbles in the film of the solution. In this case, it is impossible to stably produce an aromatic polyimide film which has a satisfactory quality and is, therefore, practically useful.

Under the above-mentioned circumstances, it was strongly desired in the aromatic polyimide industry to provide a continuous process for stably producing aromatic polyimide film from a solution of the polyimide having a high viscosity without causing any difficulties which are inherent in the conventional processes.

SUMMARY OF THE INVENTION

An object of the present invention is to provide a process for continuously producing an aromatic polyimide film directly from a solution of the aromatic polyimide having a very high viscosity and an excellent stability.

Another object of the present invention is to provide a process for continuously producing an aromatic polyimide film at a relatively low temperature without generating bubbles in the film.

Still another object of the present invention is to provide a process for continuously producing an aromatic polyimide film having uniform quality with a high reproducibility.

The above-mentioned objects can be attained by the process of the present invention which comprises the steps of;

(a) preparing a dope solution in which an aromatic polyimide prepared from a biphenyltetracarboxylic acid component and an aromatic diamine component is uniformly dissolved in a concentration of from 5% to 30% by weight in a solvent consisting of at least one phenol compound and which exhibits a rotation viscosity of from 500 to $10^5$ poises at a temperature of 100° C.;

(b) extruding the dope solution under pressure through a slit of a T-die at an extrusion temperature of 50° C. or more but at least 30° C. below the boiling point of the solvent, while controlling the apparent viscosity and the shear stress of the dope solution to from 500 to $5 \times 10^4$ poises and from $10^4$ to $10^6$ dyne cm$^{-2}$, respectively, thereby forming a filmy stream of the dope solution.

BRIEF DESCRIPTION OF THE INVENTION

The accompanying drawing is an explanatory cross-sectional view of an apparatus for carrying out the process of the present invention to continuously produce an aromatic polyimide film.

DETAILED DESCRIPTION OF THE INVENTION

The process of the present invention is quite new and capable of easily continuously producing an aromatic polyimide film directly from a solution thereof having a very high viscosity.

In the process of the present invention, an aromatic polyimide which has been prepared from biphenyl tetracarboxylic acid component and an aromatic diamine component, is uniformly dissolved in a concentration of from 5% to 30% by weight in a solvent consisting of at least one phenol compound, in order to provide a dope solution. In this case, it is necessary that the resultant aromatic polyimide dope solution exhibits a rotation viscosity of from 500 to $10^5$ poises at a temperature of 100° C.

Next, the dope solution is extruded under pressure at a temperature of 50° C. or more but at least 30° C. below the boiling point of the solvent, through a slit of a T-die. In this extruding step, it is necessary that the apparent viscosity and shear stress of the dope solution are controlled to the levels of from 500 to $5 \times 10^4$ poises and from $10^4$ to $10^6$ dye·cm$^{-2}$, respectively, in order to provide a filmy stream of the dope solution.

Next, the extruded filmy stream of the dope solution, which is, of course, in the state of a liquid, is placed on a surface of a supporting means, for example, a peripheral surface of a rotating drum or an upper surface of an endless belt, while heating the surface at a temperature of 50° C. or more and continuously moving the surface along its endless path.

Next, the placed filmy stream of the dope solution is maintained on the moving heating surface.

In the process of the present invention, the dope solution contains the aromatic polyimide having a high molecular weight and is uniformly dissolved in a concentration of 5% to 30% by weight in the phenol compound type solvent and, therefore, has a high viscosity. Since the above-mentioned type of dope solution can be used, the process of the present invention is capable of continuously producing the aromatic polyimide film having excellent mechanical properties and superior thermal resistance.

Also, in the process of the present invention, since the T-die is used, it is possible to continuously form a thin filmy stream of the polyimide dope solution having a high viscosity at a relatively low temperature.

The aromatic polyimide usable for the process of the present invention is prepared by the polymerization and the imide ring cyclization of a biphenyl tetracarboxylic acid component with an aromatic diamine component. The aromatic polyimide is uniformly dissolved in the concentration of 5% to 30% by weight in a phenol compound type solvent. The resultant dope solution has a rotation viscosity of from 500 to $10^5$ poises, preferably, from $10^3$ to $5 \times 10^4$ poises, at a temperature of 100° C.

The biphenyl tetracarboxylic acid component preferably contains 90 molar % or more, preferably, 95 molar % or more, of at least one member selected from the group consisting of 2,3,3',4'-biphenyl tetracarboxylic acid, 3,3',4,4'-biphenyl tetracarboxylic acid, and anhydrides, salts and lower alkyl esters, of the above-mentioned compounds. The biphenyl tetracarboxylic acid component may additionally contain 10 molar % or less, preferably, 5 molar % or less, of one or more member selected from the group consisting of other aromatic tetracarboxylic acids than the above mentioned aromatic tetracarboxylic acids, and aliphatic tetracarboxylic acids, for example, pyromellitic acid, 2,3,6,7-naphthalene tetracarboxylic acid, 3,3',4,4'-benzophenone tetracarboxylic acid, 2,2-bis (3,4-dicarboxyphenyl) propane, bis (3,4-dicarboxyphenyl) sulfone, bis (3,4-dicarboxyphenyl) ether and butane tetraboxylic acid. The additional tetracarboxylic acid may be in the state of a free acid, anhydride, salt, ester or a mixture of two or more of the above-mentioned state.

The aromatic diamine component usable for the present invention preferably contains at least one member selected from the group consisting of those of the formulae (I) and (II):

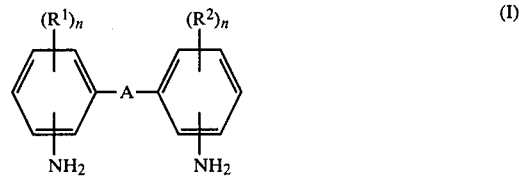

(I)

and

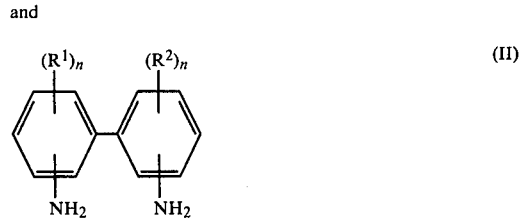

(II)

wherein $R^1$ and $R^2$ respectively, independently from each other, represent a member selected from the group consisting, of hydrogen atoms, lower alkyl radicals, and lower alkoxy radicals, n represents an integer of from 1 to 4, and A represents a divalent radical selected from the group consisting of —O—, —S—, —CO—, —SO$_2$—, —CH$_2$—and —C(CH$_3$)$_2$—.

In the present invention, a most preferable biphenyl tetracarboxylic acid component consists of 3,3',4,4'-biphenyl tetracarboxylic dianhydride (which will be referred to as S-BPDA hereinafter) or a mixture of S-BPDA and 2,3,3',4'-biphenyl tetracarboxylic dianhydride (which will be referred to as a-BPDA hereinafter). Also, a most preferable aromatic diamine component consists of 4,4'-diaminodiphenyl ether (which will be referred to as DADE hereinafter).

The aromatic polyimide usable for the present invention may be produced in such a manner that a biphenyl tetracarboxylic acid component and an aromatic diamine component are dissolved in an organic polar solvent, the solution is heated at a temperature of 100° C. or less, preferably, 60° C. or less, so as to polymerize the above mentioned components into a polyamic acid, the resultant polyamic acid solution is heated at a temperature of 150° C. or more, preferably, 180° C. or more, so as to convert the polyamic acid into the corresponding polyimide. Otherwise, the polyamic acid in the solution is imidized at a temperature of from 0° to 100° C. in the presence of an imidization accelerator. In the above-mentioned methods, the polyimide is obtained in the form of solid powder.

Furthermore, the aromatic polyimide may be produced by another method in which a biphenyl tetracarboxylic acid component and an aromatic diamine component are polymerized and imide ring cyclized in a single step in a phenol compound type solvent at a temperature of from 150° C. to 300° C., preferably, from 160° C. to 250° C. This polyimide-producing process is most preferable for the process of the present invention, because the resultant solution of the polyimide in the phenol compound type solvent from this polyimide-producing process can be directly utilized as the dope solution for the process of the present invention.

If the single step process is carried out in the presence of an imidization accelerator, the polyimide can be produced at a temperature of from ambient temperature to 100° C.

It is preferable that the aromatic polyimide usable for the present invention exhibits a logarithmic (inherent) viscosity of from about 1.0 to about 7, more preferably, from 1.2 to 5, as determined at a concentration of 0.5 g of the polymer per 100 ml of p-chlorophenol at a temperature of 50° C.

In the polyimide usable for the present invention, at least 90%, preferably, at least 95%, of the bonding groups which are capable of being converted into imide structures, forms the imide structures. That is, the content of the imide structures in the polyimide is 90% or more, more preferably, 95% or more and when the polyimide is subjected to infrared absorption spectrum analysis, very slight or substantially no absorption due to amide-acid bonds is found.

It is preferable that the imide polymer usable for the present invention have at least 80 molar %, more preferably, at least 90% molar %, of a recurring unit of the formula (V):

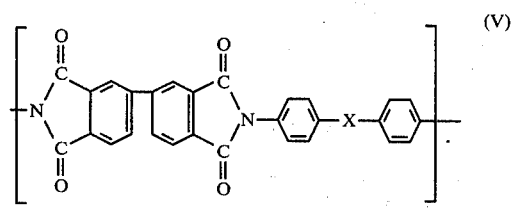

Also, it is preferable that the imide polymer has at least 60 molar %, more preferably, 70 to 99 molar %, of a recurring unit of the above mentioned formular (V) and up to 40 molar %, more preferably, from 1 to 30 molar %, of a recurring unit of the formula (VI):

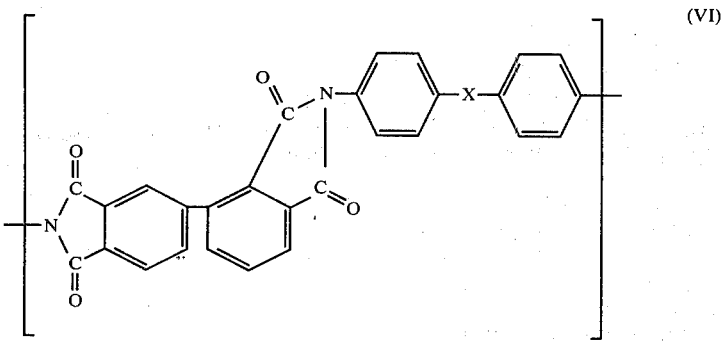

The above-mentioned types of imide polymers are highly soluble in a phenol compound type solvent and exhibit an excellent heat-resisting property and a high mechanical strength when shaped into a polyimide film.

It is preferable that the polyimide dope solution usable for the process of the present invention be a uniform solution containing 5% to 30% by weight, more preferably, 7% to 20% by weight, of the above mentioned aromatic polyimide dissolved in the phenol compound type solvent.

It is preferable that the phenol compound type solvent usable for the preparation of the polyimide dope solution contains at least one member selected from the group consisting of those of the formulae (III) and (IV):

and

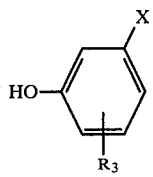

(III)

wherein R³ represents a member selected from the group consisting of a hydrogen atom and alkyl radicals having 1 to 3 carbon atoms, for example, methyl, ethyl, propyl, and dimethylmethyl radicals, and X represents a member selected from the group consisting of a hydrogen atom and halogen atoms, such as chlorine, bromine fluorine or iodine atom. The phenol compound is preferably selected from phenol, mono-halogenated phenols and mono-halogenated cresols, because of their high ability to dissolve polyimides. Mono-halogenated phenols and mono-halogenated cresols are particularly preferable.

The mono-halogenated phenols include p-chlorophenol, m-chlorophenol, p-bromophenol and m-bromophenol. The mono-halogenated cresols include 3-chloro-6-hydroxytoluene, 2-chloro-4-hydroxytoluene, 2-chloro-5-hydroxytoluene and 4-chloro-2-hydroxytoluene.

In order to produce the polyimide dope solution, the above mentioned single step polymerization - imide ring cyclization process for producing the polyimide is most preferable. This is because the solution of the imide polymer in the phenol compound type solvent resulting from the single step process can be directly utilized as the polyimide dope solution.

The polyimide dope solution may be produced by another method in which a polyimide in the form of fine particles is dissolved in a melt of the phenol compound type solvent.

In the process of the present invention, if the polyimide dope solution exhibits a rotation viscosity of less than 500 poises at a temperature of 100° C., the dope solution will exhibit a satisfactory apparent viscosity when extruded through the slit of the T-die, and, therefore, it is impossible to form a thin filmy stream of the dope solution. On the other hand, if the rotation viscosity of the polyimide solution at a temperature of 100° C. is more than $10^5$ poises, the back pressure exerted on the dope solution when extruded through a slit of a T-die is too high, which results in a non-uniform surface of the resultant thin filmy stream of the dope solution.

In accordance with the process of the present invention, a thin filmy stream of the polyimide dope solution is formed by extruding the dope solution under pressure through the slit of the T-die under predetermined extrusion conditions including an extrusion temperature in a range of from 50° C. to a level of at least 30° C. below the boiling point of the solvent, preferably, from 70° to 120° C. The predetermined extrusion conditions cause the apparent viscosity of the solution when extruded through the slit to be controlled to a range of from 500 to $5 \times 10^4$ poises, preferably, from 500 to 10000 poises, and; the shear stress of the solution when extruded through the slit to be controlled to a range of from $10^4$ to $10^6$ dyn·cm$^{-2}$, preferably, from $4 \times 10^4$ to $4 \times 10^5$ dyn·cm$^{-2}$.

It is preferable that the polyimide dope solution be filtered to remove the dust from the dope solution and, then, exposed to a reduced pressure to completely degas the dope solution, before it is extruded through the slit of the T-die.

In the process of the present invention, if the extrusion temperature is less than 50° C., the apparent viscosity of the dope solution when extruded through a slit of a T-die becomes too high, which makes it impossible to form a thin filmy stream of the solution. In this case, even if a thin filmy stream of the solution is formed, it is difficult to evaporate away the solvent from the solution in the next solidifying step. If the extrusion temperature is higher than "a temperature of 30° C. below the boiling point of the solvent", the solvent violently evaporates during the formation of the thin filmy stream of the solution, which causes the resultant thin film to contain bubbles therein.

It is essential for the process of the present invention that the apparent viscosity $\eta$ of the dope solution when extruded through a slit of a T-die sould be in a range of from 500 to $5 \times 10^4$ poises. The apparent viscosity of the dope solution is variable depending on the rotation viscosity (static viscosity) of the dope solution which is measured by a conventional measuring method, the shear rate of the dope solution when extruded through a slit of a T-die and the extrusion temperature of the dope solution. Therefore, the apparent viscosity $\eta$ of the dope solution may be adjusted to a desired value within the above specified range through adequate selection of the above-mentioned parameters. The shear rate r is calculated according to the following relationship;

$$r = 6Q/TH^2 \; (\sec^{-1})$$

wherein T represents a length of a slit of a T-die, H represents the thickness of the slit and Q represents an extrusion rate. It is preferable in the process of the present invention that the shear rate be in a range of from 5 to 300 sec$^{-1}$, more preferably, from 10 to 250 sec$^{-1}$. Also, it is preferable that the thickness H of the slit be in a range of from 0.2 to 1.3 mm, more suitably, from 0.25 to 1.0 mm.

In the present invention, the shear stress F of the dope solution when extruded through a slit of a T-die is represented by the product of the apparent viscosity $\eta$ and the shear rate r of the dope solution when extruded through a slit of a T-die. Accordingly, the shear stress of the dope solution may be adjusted to a value within the above-specified range through adequates selection of the static viscosity, the extrusion temperature and the extrusion rate of the dope solution and the size of a slit of a T-die.

The T-die usable for the process of the present invention may be of the same type as a film-forming T-die used for the extrusion of a thermoplastic resin by a T-die method. One example of the preferred T-dies usable for the process of the present invention is shown in the accompanying drawing. Referring to the drawing, a T-die 1 comprises a slit 3, a manifold 2 placed above the slit 3 and a dope pool 4 serving to homogenize the dope solution and communicating with the manifold 2. The dope pool 4 preferably has therein any appropriate perforated plate effective for homogenizing the dope solution.

The back pressure under which the dope solution is extruded through the slit 3 of the T-die 1 may be applied by any appropriate means. It is preferable, however, that the back pressure be applied by a gear pump 5 which is also capable of feeding the dope solution from a dope solution tank 6 into the T-die 1 at a constant flow rate. It is preferable that the back pressure applied to the T-die 1 be in a range of from 2 to 100 kg/cm², more preferably, from 5 to 50 kg/cm², still more preferably, from 10 to 30 kg/cm².

It is preferable that the T-die 1 be surrounded by a heating means 13, so as to maintain the dope solution contained therein at a desired constant temperature.

In the process of the present invention, a thin filmy stream 10 of the dope solution formed by the T-die extrusion method as described above is placed on a surface of a supporting means while heating the surface at a temperature of 50° C. or more and while continuously moving the surface along an endless path thereof. The surface of the supporting means may be, for example, a peripheral surface of a heated rotating metal drum 7 or an upper surface of a heated circulating endless metal belt (not shown in the drawing). The placed filmy stream of the dope solution is held on the moving surface heated at a temperature of 50° C. or more until the thickness of the resultant film of the dope solution becomes uniform and then the film is solidified by evaporating the solvent from the film to an extent that the concentration of the solvent in the resultant solidified film reaches 50% by weight or less, preferably, 5% to 45% by weight.

The thickness of the thin filmy stream of the dope solution to be placed on the moving heating surface of the supporting means is preferably in a range of from about 0.01 to 2.0 mm, more preferably, from 0.1 to 1.5 mm. The thickness of the thin filmy stream of the dope solution is variable depending on the extrusion rate of the dope solution and the moving speed of the surface of the supporting means. The supporting means may be selected from the rotating drums and the endless belts which are conventionally used for a conventional solution casting method. The surface of the supporting means may be made of a metal selected from the group consisting of nickel, chromium, copper and stainless steel. The surface of the supporting means is thoroughly polished so as to make it smooth and even. The surface of the supporting means may be plated with nickel or chromium. The surface layer of the supporting means may be composed of an iron support coated with a layer of copper, nickel or an alloy of nickel and chromium.

It is preferable that the surface of the supporting means such as the metal drum or belt be heated to a temperature of 50° C. or more but below the boiling temperature of the solvent, more preferably, from about 70° C. to 180° C. Also, it is preferable that the moving speed of the surface of the supporting means such as the drum or belt be in a range of from 1 to 200 cm/min, more preferably, from 5 to 100 cm/min.

While the thin film of the solution formed on the surface of the supporting means such as the drum or belt is being moved together with the movement of the drum or belt, dry hot air is blown toward the upper surface of the thin film, so as to evaporate away the solvent from the thin film of the solution.

The solidification of thin film of the dope solution is preferably carried out in such a manner that the content of the solvent in the thin film of the dope solution formed on the moving heating surface of the supporting means is reduced to a level of 50% by weight or less, preferably, 5% to 45% by weight, more preferably, from 7% to 25% by weight, by evaporating a portion of the solvent from the thin film of the dope solution the resultant thin solid film is then peeled off from the smooth surface of the supporting means, and, then, the thin film containing the residual amount of the solvent is finally heated at a temperature of from 200° to 600° C., preferably, from 250° C. to 550° C., so as to remove substantially all of the remaining solvent.

Referring to the accompanying drawing, a thin filmy stream 10 of the dope solution extruded through the slit 3 of the T-die 1 is continuously placed on a peripheral smooth surface of the rotating drum 7 located in a chamber 14 so as to form a thin film of the dope solution, hot air is blown toward the upper surface of the thin film of the dope solution through a blowing means (not shown in the drawing), so as to evaporate the solvent from the thin film of the dope solution to an extent that a residual amount of the solvent reaches a level of 50% by weight or less, preferably, 5% to 45% by weight.

The vapor of the solvent is exhausted from the chamber 14 through an exhaust duct 15.

The solidified film 10a is continuously peeled off from the surface of the drum 7, and introduced into a high temperature drying oven 8, wherein the peeled film 10a is conveyed by a pin tenter 9 which is endlessly circulated around a pair of shaft 16. Subsequently, the film 10a is allowed to pass through the oven 8 while being heated to an elevated temperature of 200° C. to 600° C. by blowing hot air through a heater 11 in the oven 8 toward the film 10a so as to remove the remaining solvent from the film 10a. The resultant solid film 12 which is free from the solvent is wound up on a winder roll 17. The solid film 12 consists of an aromatic polyimide.

In accordance with the process of the present invention, a polyimide film having a thickness of from about 5 to 150 microns can be produced at a speed of from 1 to 200 cm/min.

The polyimide film obtained by the process of the present invention exhibits an excellent mechanical strength, an excellent heat-resisting property and an excellent electric insulating property. Accordingly, the polyimide film can be used as an electric insulating material such as a printed-circuit board and an IC chip-carrying tape.

The present invention will be further illustrated by means of the following examples, which are only illustrative and not limitative thereof.

Examples 1 through 6

In each of the Examples 1 through 6, 4.87 kg of a biphenyl tetracarboxylic dianhydride (S-BPDA), 3.31 kg of 4,4'-diaminodiphenyl ether (DADE) and 60 kg of p-chlorophenol were charged into an autoclave. The mixture was subjected to a polymerization-imidization reaction in a single step at a temperature as indicated in Table 1 for a period of time as indicated in Table 1, so as to obtain a polyimide solution. The polyimide solution was fed into a degassing vessel provided with a filter disposed therein. The solution was filtered and degassed at a temperature of about 90° C. A dope solution of the polyimide was obtained.

Table 1 indicates the logarithmic viscosity of the polyimide contained in the dope solution, as measured at a concentration of 0.5 g per 100 ml of p-chlorophenol at a temperature of 50° C., the degree of imidization of the polyimide, as measured by infrared absorption spectrum analysis, the concentration of the polyimide in the dope solution, as represented in % by weight, and the rotation viscosity of the dope solution, as measured at a temperature of 100° C. and represented in poise.

TABLE 1

| Example No. | Reaction conditions | | Polymer in dope solution | | Nature of dope solution | |
|---|---|---|---|---|---|---|
| | reaction temperature (°C.) | reaction time (hr) | logarithmic viscosity | degree of imidization (%) | polymer concentration (% by weight) | rotation viscosity (100° C.) (poise) |
| 1 | 160 | 5 | 1.82 | 90% or more | 11.2 | 4500 |
| 2 | 175 | 7 | 2.00 | " | " | 15000 |
| 3 | 175 | 5 | 1.96 | " | " | 9700 |
| 4 | 175 | 20 | 2.09 | " | " | 26000 |
| 5 | 160 | 20 | 2.03 | " | " | 21000 |
| 6 | 160 | 20 | 2.03 | " | " | 21000 |

In each of the Examples 1 through 3, the polymerization-imidization reaction was carried out while flowing nitrogen gas through the reaction atmosphere, while in each of the Examples 4 through 6, the reaction was carried out in a closed state.

The resultant dope solution was extruded under pressure through a slit of a T-die under extrusion conditions as indicated in Table 2, so as to form a thin filmy stream of the dope solution. The slit had a length of 360 mm and a thickness H as indicated in Table 2. The thin filmy stream of the dope solution was then placed on a smooth surface of a metal drum heated to a temperature of from about 120° to 170° C. and which was rotating at a peripheral speed as indicated in Table 2, and, hot air having a temperature of from about 115° C. to 200° C. was blown toward the upper surface of the resultant thin film of the dope solution, so as to solidify it by evaporating away the major portion of the solvent from the thin film of the solution to an extent that a residual amount of the solvent in the film was reduced to about 25% by weight. The resultant solidified thin film was introduced into a drying oven and passed therethrough while being supported by a pin tenter. In this oven, the remaining amount of the solvent was completely removed from the thin film by heating it with a heater having a surface temperature of from about 250° C. to 550° C. and by blowing hot air having a temperature of about 400° C. onto the surface of the film. A polyimide film having a uniform thickness as indicated in Table 2 was continuously produced.

TABLE 3

| Type of film | Example 2 | Example 6 |
|---|---|---|
| Thickness of film (μ) | 25 | 50 |
| Tensile strength (at breaking point) (kg/mm$^2$) | 22.5 | 20.1 |
| Ultimate elongation (%) | 90.2 | 71.5 |
| Tear resistance at edge (kg) | 19.1 | 17.3 |
| Initiation temperature of thermal decomposition (°C.) | 425 | 415 |
| Thermal shrinkage at 150° C. (%) | 0.03 | 0.07 |
| Thermal shrinkage at 200° C. (%) | 0.13 | 0.18 |
| Heat-resisting life (*) (°C.) | 272 | 268 |
| Hygroscopicity (relative humidity 50%) (%) | 1.31 | 1.50 |
| Breakdown strength (V/25 μ) | 7300 | 6000 |
| Dielectric constant | 4.80 | |
| Dielectric loss tangent | 1.28 × 10$^{-3}$ | |
| Volume resistivity at 50° C. (Ω-cm) | 6.0 × 10$^{16}$ | |
| Volume resistivity at 200° C. (Ω-cm) | 1.8 × 10$^{15}$ | |

Note:
The heat-resisting life of a film is represented by a temperature (°C.) which causes, when the film is heated at the temperature for 20,000 hours, the heated film to exhibit a tensile strength corresponding to half of the original strength thereof.

The polyimide films prepared in the other examples besides Examples 2 and 6 exhibited similar properties to those indicated in Table 3.

Example 7

A 1.09 kg amount of 3,3',4,4'-biphenyl tetracarboxylic dianhydride (S-BPDA), 0.12 kg of 2,3,3',4'-biphenyl tetracarboxylic dianhydride (a-BPDA), 0.83 kg of 4,4'-diaminodiphenyl ether (DADE) and 15 kg of phenol were charged into an autoclave. The mixture was

TABLE 2

| Example | 1 | 2 | 3 | 4 | 5 | 6 |
|---|---|---|---|---|---|---|
| Dope solution Type | Ex-1 | Ex-2 | Ex-3 | Ex-4 | Ex-5 | Ex-6 |
| Rotation viscosity at 100° C. (poise) | 4500 | 15000 | 9700 | 26000 | 21000 | 21000 |
| Slit thickness H (mm) | 0.28 | 0.30 | 0.28 | 0.30 | 0.30 | 0.30 |
| Back pressure applied to dope solution in T-die (kg/cm$^2$) | 15~20 | 15~20 | 22 | 38 | 15~20 | 15~20 |
| Extrusion rate (mm$^3$ · sec$^{-1}$) | 267.7 | 718.7 | 180.0 | 600.0 | 180.0 | 360.0 |
| Extrusion temperature (°C.) | 95 | 95 | 77 | 95 | 95 | 95 |
| Apparent viscosity of dope solution when extrude through slit (poise) | 1300 | 1400 | 3900 | 2000 | 4000 | 2600 |
| Shear rate r (sec$^{-1}$) | 56.9 | 133.1 | 38.3 | 111.1 | 33.3 | 66.7 |
| Shear stress F (dyn · cm$^{-2}$) | 7.4 × 10$^4$ | 1.9 × 10$^5$ | 1.5 × 10$^5$ | 2.2 × 10$^5$ | 1.3 × 10$^5$ | 1.7 × 10$^5$ |
| Formation of a thin film of dope solution | excellent | excellent | excellent | excellent | excellent | excellent |
| Peripheral speed of rotating drum (cm/min) | 23.5 | 60 | 15 | 50 | 15 | 15 |
| Thickness of resultant polyimide film (microns) | 25 | 25 | 25 | 25 | 25 | 50 |

The properties of the polyimide films prepared in Examples 2 and 6 are shown in Table 3.

subjected to a polymerization-imidizaion reaction in a single step at a temperature of from 175° C. to 180° C. for a period of 13 hours, so as to obtain a polyimide solution. The polyimide solution was fed into a degassing vessel provided with a filter disposed therein, and the solution was filtered and degassed at a temperature of about 85° C. A dope solution of the polyimide was obtained.

The polyimide contained in the dope solution exhibited a logarithmic viscosity of 2.2, measured at a concentration of 0.5 g per 100 ml of phenol, and a degree of imidization of 90% or more. The dope solution had a concentration of the polyimide of 10.5% by weight and a rotation viscosity of 2400 poises at a temperature of 100° C.

The resultant dope solution was extruded under a back pressure of 16 kg/cm² through a T-die equipped with a slit having a length T of 360 mm and a thickness H of 0.30 mm at an extrusion rate Q of 333.3 mm³/sec and an extrusion temperature of 80° C., so as to form a filmy stream of the dope solution. The filmy stream of the solution was then placed on a smooth surface of a metal drum heated to a temperature of 94° C. and which was rotating at a peripheral speed of 22.3 cm/min. The resultant film of the dope solution was solidified by blowing hot air having a temperature of about 160° C. toward the upper surface of the film of the dope solution, so as to evaporate the solvent from the film of the dope solution to an extent that a residual amount of the solvent in the film was reduced to about 20% by weight. The solidified film was peeled off from the metal drum surface and introduced into a drying oven wherein the film was supported by a pin tenter. Then, the film was allowed to pass through the oven while being heated by a heater having a surface temperature of from about 250° to 450° C. and hot air having a temperature of about 400° C., so as to substantially completely remove the remaining solvent from the film. Thus, a polyimide film having a thickness of about 23.1 microns was continuously produced.

The extrusion procedure was carried out under conditions so that the shear rate r of the dope solution when extruded through the slit was 61.7 sec$^{-1}$, the apparent viscosity $\eta$ of the dope solution when extruded through the slit was 750 poises, and the shear stress F of the dope solution when extruded through the slit was $4.6 \times 10^4$ dyn·cm².

The resultant polyimide film exhibited a tensile strength of 20.9 kg/mm² and an ultimate elongation of 72.6%. The heat-resisting property and the electric insulating property of the polyimide film were similar to those of the polyimide film of Example 2.

We claim:

1. A process for continuously producing an aromatic polyimide film, comprising the steps of:
    (a) preparing a dope solution in which an aromatic polyimide prepared from a biphynyltetracarboxylic acid component and an aromatic diamine component is uniformly dissolved in a concentration of from 5% to 30% by weight in a solvent consisting of at least one phenol compound, said dope solution exhibiting a rotation viscosity of from 500 to $10^5$ poises at a temperature of 100° C.;
    (b) extruding said dope solution under pressure through a slit of a T-die at an extrusion temperature in the range of from 70° C. to 120° C. but at least 30° C. below the boiling point of said solvent, while controlling the apparent viscosity and the shear stress of said dope solution to from 500 to $5 \times 10^4$ poises and from $10^4$ to $10^6$ dyne·cm$^{-2}$, respectively, thereby forming a filmy stream of said dope solution;
    (c) placing said extruded filmy stream of said dope solution on a surface of a supporting means while heating said surface at an elevated temperature in the range of 70° C. to 180° C. and continuously moving along an endless path thereof;
    (d) maintaining said placed filmy stream of said dope solution on said moving heating surface of said supporting means until said film stream of said dope solution forms a film having a uniform thickness and then, said film is solidified by evaporating said solvent therefrom to an extent that the concentration of said solvent in the resultant solidified film reaches 50% by weight or less; said evaporation being carried out by blowing hot air towards the upper surface of the film of said dope solution;
    (e) peeling off the solidified film from said moving heating surface of said supporting means; and
    (f) drying the peeled film at a temperature of from 200° C. to 600° C. to provide an aromatic polyimide film free from said solvent.

2. A process as claimed in claim 1, wherein said dope solution is prepared by polymerization and imide ring cyclization, in one single step, of said biphenyl tetracarboxylic compound with said aromatic diamine in said solvent, at a temperature of from 150° C. to 300° C.

3. A process as claimed in claim 1, wherein said biphenyl tetracarboxylic acid component contains 90 molar % or more of at least one member selected from the group consisting of 2,3,3',4'-biphenyl tetracarboxylic acid, 3,3',4,4'-biphenyl tetracarboxylic acid and their anhydrides, salts and lower alkyl esters.

4. A process as claimed in claim 3, wherein said biphenyl tetracarboxylic acid component additionally contains 10 molar % or less of at least one additional tetracarboxylic acid selected from the group consisting of pyromellitic acid, 2,3,6,7,-naphthalene tetracarboxylic acid, 3,3',4,4'-benzophenone tetracarboxylic acid, 2,2-bis (3,4-dicarboxyphenyl) propane, bis (3,4-dicarboxyphenyl) sulfone, bis (3,4-dicarboxyphenyl) ether, and butane tetracarboxylic acid, and anhydrides, salts, and esters of the above-mentioned acids.

5. A process as claimed in claim 1, wherein said aromatic diamine component contains at least one member selected from the group consisting of those of the formulae (I) and (II):

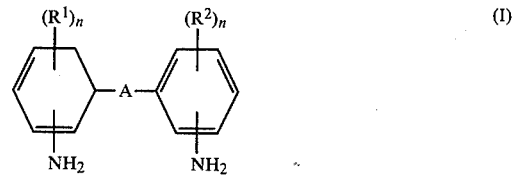

(I)

and

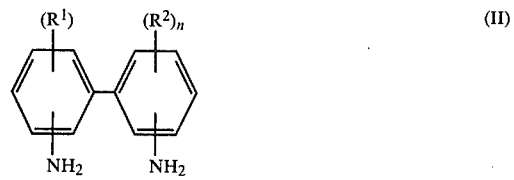

(II)

wherein $R^1$ and $R^2$ respectively, independently from each other, represent a member selected from the group consisting of a hydrogen atom, lower alkyl radicals and lower alkoxy radicals, n represents an integer of from 1 to 4, and A represents a divalent radical selected from the group consisting of —O—, —S—, —CO—, —SO$_2$—, —SO—, —CH$_2$—, and —C(CH$_3$)$_2$—.

6. A process as claimed in claim 1, wherein said phenol compound is selected from the group consisting of those of the formulae (III) and (IV):

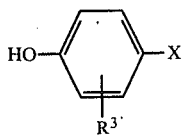
(III)

and

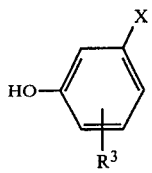
(IV)

wherein R$^3$ represents a member selected from the group consisting of a hydrogen atom and alkyl radicals having 1 to 3 carbon atoms, and X represents a member selected from the group consisting of a hydrogen atom and halogen atoms.

7. A process as claimed in claim 6, wherein said phenol compound is selected from the group consisting of phenol, monohalogenated phenols and monohalogenated cresols.

8. The process as claimed in claim 1, wherein the solidified film contains the solvent in a concentration of from 5% to 45% by weight.

9. The process as claimed in claim 1, wherein said peeled film is dried at a temperature of from 250° C. to 550° C.

* * * * *

UNITED STATES PATENT AND TRADEMARK OFFICE
CERTIFICATE OF CORRECTION

PATENT NO. : 4,473,523

DATED : September 25, 1984

INVENTOR(S) : Yoshikazu SASAKI et al.

It is certified that error appears in the above—identified patent and that said Letters Patent is hereby corrected as shown below:

Claim 1, line 4 (column 13, line 53), change "biphynyltetracarboxy-" to --biphenyltetracarboxy- --.

Signed and Sealed this

Twenty-sixth Day of March 1985

[SEAL]

Attest:

DONALD J. QUIGG

Attesting Officer     Acting Commissioner of Patents and Trademarks